(12) United States Patent
Inada et al.

(10) Patent No.: US 12,429,727 B2
(45) Date of Patent: Sep. 30, 2025

(54) ELECTRONIC DEVICE COMPRISING A TRANSPARENT CONDUCTIVE LAYER EXPOSED BY AN OPENING OF A REFLECTIVE SUB-LAYER

(71) Applicant: Innolux Corporation, Miaoli County (TW)

(72) Inventors: Toshiya Inada, Miaoli County (TW); Kazuto Jitsui, Miaoli County (TW); Satoru Takahashi, Miaoli County (TW)

(73) Assignee: Innolux Corporation, Miaoli County (TW)

( * ) Notice: Subject to any disclaimer, the term of this patent is extended or adjusted under 35 U.S.C. 154(b) by 2 days.

(21) Appl. No.: 18/313,363

(22) Filed: May 7, 2023

(65) Prior Publication Data

US 2024/0369874 A1    Nov. 7, 2024

(51) Int. Cl.
*G02F 1/1335* (2006.01)
*G02F 1/1333* (2006.01)

(52) U.S. Cl.
CPC .. *G02F 1/133553* (2013.01); *G02F 1/133345* (2013.01); *G02F 1/133371* (2013.01); *G02F 2203/02* (2013.01); *G02F 2203/09* (2013.01)

(58) Field of Classification Search
CPC ................................................... G02F 2203/09
See application file for complete search history.

(56) References Cited

U.S. PATENT DOCUMENTS

| 2006/0290851 A1 | 12/2006 | Kim et al. |
| 2007/0153174 A1 | 7/2007 | Kim |
| 2007/0222925 A1* | 9/2007 | Park ................. G02F 1/133555 349/114 |
| 2021/0373370 A1* | 12/2021 | Cheng ................. G02F 1/13624 |
| 2023/0015072 A1* | 1/2023 | Satoh ................. G02F 1/133555 |

FOREIGN PATENT DOCUMENTS

| CN | 106950736 A | * | 7/2017 | ......... G02F 1/13338 |
| CN | 109427819 B | * | 5/2021 | ....... G02F 1/133345 |
| CN | 109313368 B | * | 2/2022 | ............. C08G 73/10 |

* cited by examiner

*Primary Examiner* — Paul C Lee
(74) *Attorney, Agent, or Firm* — JCIPRNET

(57) ABSTRACT

An electronic device provided herein includes a substrate, a circuit layer, a first insulating layer, a first reflective layer, a second insulating layer, a second reflective layer. The circuit layer is disposed on the substrate. The first insulating layer is disposed on the circuit layer. The first reflective layer is disposed on the first insulating layer. The second insulating layer is disposed on the first reflective layer. The second reflective layer is disposed on the second insulating layer. The second reflective layer includes a plurality of reflective sub-layers, and a portion of the first reflective layer is disposed corresponding to a gap between two adjacent ones of the plurality of reflective sub-layers.

16 Claims, 6 Drawing Sheets

100A

ELECTRONIC DEVICE COMPRISING A TRANSPARENT CONDUCTIVE LAYER EXPOSED BY AN OPENING OF A REFLECTIVE SUB-LAYER

BACKGROUND

Technical Field

The disclosure is related to an electronic device.

Description of Related Art

In products of display, the reflective and/or trans-reflective display has low power consumption since the ambient light is used as the required light source. The display brightness of the reflective and/or trans-reflective display is determined by the reflective efficiency of the product design. Therefore, improvement of the reflectance in the reflective and/or trans-reflective display is always concerned.

SUMMARY

The disclosure is directed to an electronic device have good reflective display effect.

In accordance with some embodiments, an electronic device includes a substrate, a circuit layer, a first insulating layer, a first reflective layer, a second insulating layer, a second reflective layer. The circuit layer is disposed on the substrate. The first insulating layer is disposed on the circuit layer. The first reflective layer is disposed on the first insulating layer. The second insulating layer is disposed on the first reflective layer. The second reflective layer is disposed on the second insulating layer. The second reflective layer includes a plurality of reflective sub-layers, and a portion of the first reflective layer is disposed corresponding to a gap between two adjacent ones of the plurality of reflective sub-layers.

In light of the foregoing, the electronic device in accordance with the embodiments of the disclosures includes the first reflective layer located at the gap of the second reflective layer to provide an enhanced reflecting effect. Therefore, the electronic device has desirable reflective display effect.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
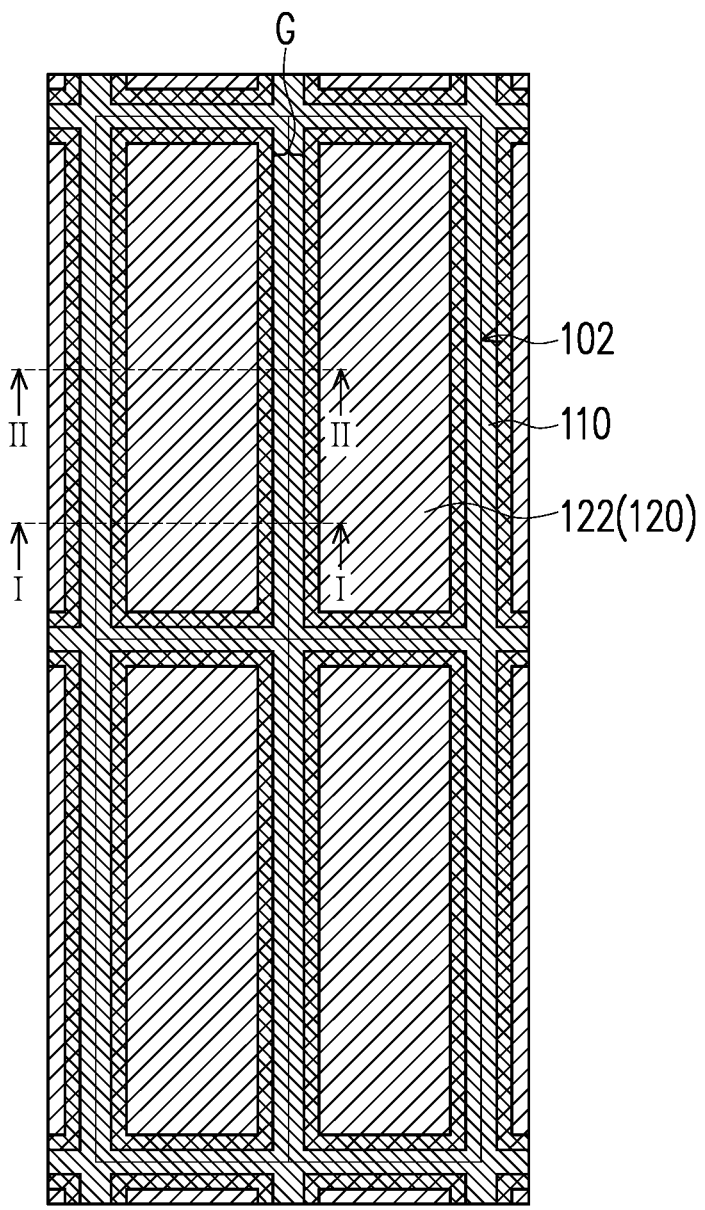
FIG. 1 schematically illustrates a top view of a portion of an electronic device in accordance with some embodiments.

A structure (or layer, component, substrate) being located on another structure (or layer, component, substrate) described in the disclosure may mean that two structures are adjacent and directly connected, or may mean that two structures are adjacent and indirectly connected. Indirect connection means that there is at least one intermediate structure (or intermediate layer, intermediate component, intermediate substrate, intermediate spacing) between two structures, the lower surface of a structure is adjacent or directly connected to the upper surface of the intermediate structure, and the upper surface of the other structure is adjacent or directly connected to the lower surface of the intermediate structure. The intermediate structure may be a single-layer or multi-layer physical structure or non-physical structure, which is not limited. In the disclosure, when a structure is disposed "on" another structure, it may mean that a structure is "directly" disposed on another structure, or a structure is "indirectly" disposed on another structure, that is, at least one structure is sandwiched between a structure and another structure.

The electrical connection or coupling described in the disclosure may refer to direct connection or indirect connection. In the case of a direct connection, terminals of two components on a circuit are directly connected or interconnected by a conductor segment. In the case of an indirect connection, there are switches, diodes, capacitors, inductors, other suitable components, or a combination of the above components between terminals of two components on a circuit, but are not limited thereto.

In the disclosure, the thickness, length and width may be measured by an optical microscope, and the thickness may be measured by a cross-sectional image in an electron microscope, but is not limited thereto. In addition, there may be some error between any two values or directions used for comparison. If a first value is equal to a second value, it implies that there may be an error of approximately 10% between the first value and the second value; if a first direction is perpendicular to a second direction, it implies that an angle between the first direction and the second direction may range from 80 to 100 degrees; and if a first direction is parallel to a second direction, it implies that an angle between the first direction and the second direction may range from 0 to 10 degrees.

The electronic device described in the disclosure may include a bendable electronic device or a flexible electronic device. The electronic device may, for example, include a liquid crystal or a light emitting diode; the light emitting diode may, for example, include an organic light emitting diode (OLED), a sub-millimeter light emitting diode (mini LED), a micro light emitting diode (micro LED) or a quantum dot (QD) light emitting diode (for example, QLED or QDLED), fluorescence, phosphor or other suitable materials, and the materials may be optionally combined, but the present disclosure is not limited thereto. The antenna device may be, for example, a liquid crystal antenna, but the present disclosure is not limited thereto. The tiled device may be, for example, a display tiled device or an antenna tiled device, but the present disclosure is not limited thereto. It should be noted that the electronic device may be the optional combination of the above, but the present disclosure is not limited thereto.

Exemplary embodiments of the disclosure are described in detail, and examples of the exemplary embodiments are shown in the accompanying drawings. Whenever possible, the same component symbols are used in the drawings and descriptions to indicate the same or similar parts.

FIG. 1 schematically illustrates a top view of a portion of an electronic device in accordance with some embodiments. In FIG. 1, the electronic device 100 may include a plurality of display units 102 arranged in an array in the plane defined by X-axis and Y-axis. In some embodiments, each of the display units 102 is configured to present a specific brightness so as to display an image when the electronic device 100 performs a display function. Therefore, the electronic device 100 may include a device panel, but not limited thereto. As shown in FIG. 1, the electronic device 100 may include a first reflective layer 110 and a second reflective layer 120. Other components of the electronic device 100 are omitted in FIG. 1 for clearly presenting the first reflective layer 110 and the second reflective layer 120. Specifically, the second reflective layer 120 includes a plurality of reflective sub-layers 122. Each of the reflective sub-layers 122 is located within one of the display units 102 to serve as a pixel electrode. For electric independency of the pixel electrode, a gap G is formed between two adjacent ones of the plurality of reflective sub-layers 122, and the reflective sub-layers 122 are spaced from each other. The first reflective layer 110 is disposed corresponding to the gap G. Since the reflective sub-layers 122 are arranged in an array corresponding to the display units 102, the first reflective layer 110 is disposed corresponding to the gap G to form a mesh-like structure in the top view as shown in FIG. 1.

In some embodiments, the first reflective layer 110 may at least overlap the gap G between the reflective sub-layers 122 and may further overlap the reflective sub-layers 122 of the second reflective layer 120 in the top view. For example, the first reflective layer 110 may overlap the peripheries of the reflective sub-layers 122. In some embodiments, a reflectance of the first reflective layer 110 may be greater than 80% (80%<reflectance<100%) and a reflectance of the second reflective layer 120 may be also greater than 80% (80%<reflectance<100%). The material of the first reflective layer 110 and/or the second reflective layer 120 may include silver, aluminum, or an alloy thereof. The electronic device 100 may involve high reflective efficiency since the areas of the display units 102 are substantially completely covered by the first reflective layer 110 and the second reflective layer 120. In the application of a reflective device panel, the electronic device 100 may have desired display brightness since the areas of the reflective sub-layers 122 and the area of the gap G are both covered by reflective material.

Figure 2:
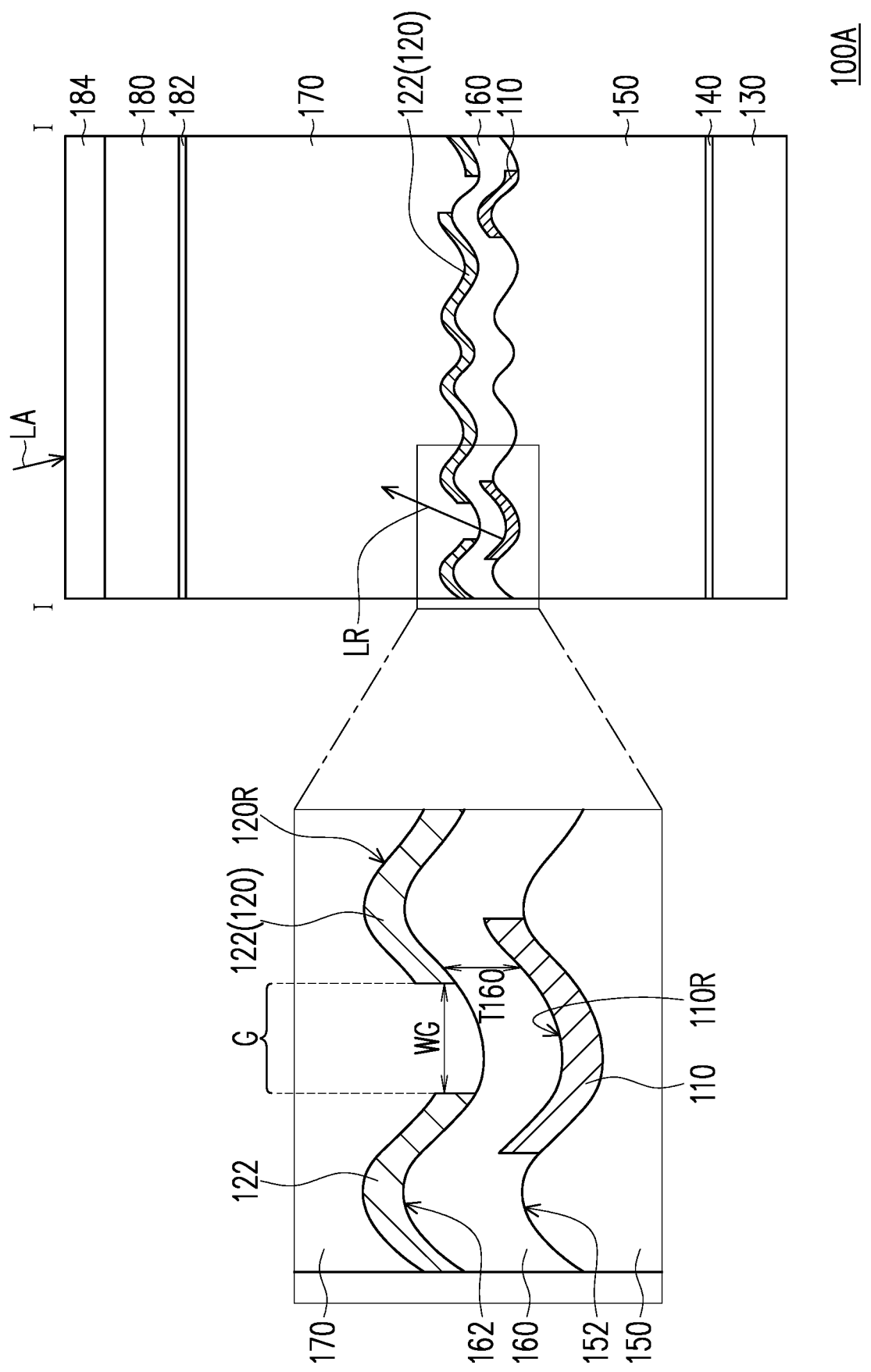
FIG. 2 schematically illustrates a cross sectional view of a portion of an electronic device in accordance with some embodiments.

FIG. 2 schematically illustrates a cross sectional view of a portion of an electronic device in accordance with some embodiments. The cross sectional view of FIG. 2 may be considered as an implemental embodiment of the electronic device 100 taken along line I-I of FIG. 1. Specifically, some components presented in FIG. 2 is omitted in FIG. 1 since FIG. 1 mainly shows the first reflective layer 110 and the second reflective layer 120 for illustrative purpose. Referring to FIG. 2, the electronic device 100A at least includes a substrate 130, a circuit layer 140, a first insulating layer 150, the first reflective layer 110, a second insulating layer 160 and the second reflective layer 120. The circuit layer 140, the first insulating layer 150, the first reflective layer 110, the second insulating layer 160 and the second reflective layer 120 may be sequentially disposed on the substrate 130. In other words, the circuit layer 140 is disposed on the substrate 130, the first insulating layer 150 is disposed on the circuit layer 140, the first reflective layer 110 is disposed on the first insulating layer 150, the second insulating layer 160 is disposed on the first reflective layer 110, and the second reflective layer 120 is disposed on the second insulating layer 160. The second reflective layer 120 includes a plurality of reflective sub-layers 122 and a portion of the first reflective layer 110 is disposed corresponding to a gap G between two adjacent ones of the plurality of reflective sub-layers 122.

In some embodiments, the electronic device 100A may further includes a liquid crystal layer 170 disposed on the second reflective layer 120. In addition, the electronic device 100A may further includes another substrate 180 disposed opposite to the substrate 130 and the liquid crystal layer 170 is sealed between the substrate 130 and the another substrate 180. In some embodiments, the electronic device 100A may further include a top electrode layer 182 disposed on the another substrate 180 and between the liquid crystal layer 170 and the another substrate 180. In some embodiments, the electronic device 100A may further include an optical component 184 disposed on the another substrate 180 opposite to the top electrode layer 182. The optical component 184 includes a polarizer, a diffuser, a quarter wave plate, a brightness enhancement sheet, or any combination thereof. The another substrate 180, the top electrode layer 182 and the optical component 184 are components that allow the front light LA to pass through to irradiate the first reflective layer 110 and the second reflective layer 120. The front light LA may be reflected by the first reflective layer 110 and the second reflective layer 120 to form a reflected light LR. In some embodiments, the front light LA may be an ambient light, but the disclosure is not limited thereto.

The reflective sub-layers 122 may be configured to be applied with a data voltage and the top electrode layer 182 may be configured to be applied with a common voltage such that an electric field established between the reflective sub-layers 122 and the top electrode layer 182 would drive the liquid crystal layer 170 to display an image. In some embodiments, the first reflective layer 110 may be electrically floating, and no voltage is applied to the first reflective layer 110. In some embodiments, the first reflective layer 110 may be applied with a voltage different from the data voltage applied to the reflective sub-layer 122, for example, the first reflective layer may be applied with the common voltage which is the same as the voltage applied to the top electrode layer 182. In some embodiments, the first reflective layer 110 is configured to be applied with a reference voltage less than the data voltage applied to the second reflective layer 120. For example, the voltage range of the data voltage applied to the reflective sub-layers 122 is predetermined by the design of the driving system of the electronic device 100A and the first reflective layer 110 may be applied with a voltage value that is less than the maximum voltage value of the predetermined voltage range of the data voltage applied to the reflective sub-layers 122 (e.g. pixel electrodes). The voltage applied to the first reflective layer 110 may have least influence on the driving electric field established between the reflective sub-layers 122 and the top electrode layer 182, and the display gray scale is mainly determined by the driving electric field established between the reflective sub-layers 122 and the top electrode layer 182.

The substrate 130 may be made of, for example, glass, quartz, stainless steel, copper, graphite sheet, ceramic or other suitable materials, or a combination of the above materials. In some embodiments, the substrate 130 may be a composite stack, such as a stack of polyimide-inorganic layer, but the disclosure is not limited thereto. The circuit layer 140 is configured to provide driving signals to the reflective sub-layers 122 of the second reflective layer 120, but not limited thereto. In some embodiments, the circuit layer 140 may be an array of active devices that may include scan lines, data lines and active devices connected to the scan lines and the data lines. In some embodiments, the circuit layer 140 may be a passive driving circuit which includes transmitting wirings to transmit the required signals to the reflective sub-layers 122 of the second reflective layer 120.

As shown in FIG. 2, the first insulating layer 150 disposed on the circuit layer 140 may have a bumpy surface 152. In some embodiments, the first insulating layer 150 may be of an organic material. The organic material forming the first insulating layer 150 may be photo sensitive and the bumpy surface 152 may be formed by patterning the organic material through a lithographical technique, but the disclosure is not limited thereto. In some embodiments, the bumpy surface 152 of the first insulating layer 150 may be formed through other patterning technique such as printing, etching, pressing or the like. The bumpy surface 152 is formed at a side of the first insulating layer 150 away from the circuit layer 140. The first reflective layer 110 is disposed on the bumpy surface 152 and is substantially curved along the bumpy surface 152. In some embodiments, the first reflective layer 110 is conformed to the bumpy surface 152. Accordingly, the first reflective layer 110 may have a curved reflective surface 110R facing toward the liquid crystal layer 170, but the disclosure is not limited thereto.

The second insulating layer 160 is formed on the first insulating layer 150 covering the first reflective layer 110. The second insulating layer 160 may be made of inorganic material such as SiOx or SiNx, but the disclosure is not limited thereto. The second insulating layer 160 may be disposed on the first reflective layer 110 through a deposition technique, but the disclosure is not limited thereto. The second insulating layer 160 may be curved along the bumpy surface 152 of the first insulating layer 150 and have a bumpy surface 162 away from the first insulating layer 150. Therefore, the second reflective layer 120 disposed on the second insulating layer 160 may have a curved reflective surface 120R facing the liquid crystal layer 170. In some embodiments, the bumpy surface 152 of the first insulating layer 150 and the bumpy surface 162 of the second insulating layer 160 may be corresponding to or substantially conformal to each other, but the disclosure is not limited thereto.

The curved reflective surface 120R of the second reflective layer 120 enables the reflection of the front light LA toward various direction, and the electronic device 100A may provide a display effect of wide viewing angle. The first reflective layer 110 is located between the gaps G of the reflective sub-layers 122 of the second reflective layer 120, and the front light LA irradiates at the gaps G of the reflective sub-layers 122 is able to be reflected by the first reflective layer 110 to form the reflected light LR, which improves the reflective efficiency of the electronic device 100A and enhances the display brightness under reflective display technique.

In some embodiments, a thickness T160 of the second insulating layer 160 is determined by measuring the individual thickness at multiple points of the second insulating layer 160 in a cross sectional view and averaging the measured individual thicknesses. For example, 3 to 5 points of the second insulating layer 160 within one display unit 102 (denoted in FIG. 1) in the cross sectional view are measured to obtain the thickness T160. It should be noted that in this disclosure, "the thickness of a specific layer at a point" is the distance between the top surface and the bottom surface of the specific layer at that point, and the distance is measured along a normal direction of the substrate 130. The thickness T160 of the second insulating layer 160 is small, and most of the reflected light LR reflected by the first reflective layer 110, would pass through the gap G rather than being blocked by the second reflective layer 120, it further enhances the reflective efficiency of the electronic device 100A. In other words, the small thickness T160 of the second insulating layer 160 allows the reflected light LR travelling in a large scattering angle to pass through the gap G. In some embodiments, the thickness T160 of the second insulating layer 160 may be less than 0.7 μm (0<thickness of second insulating layer<0.7 μm). In some embodiments, the thickness T160 of the second insulating layer 160 may be less than 30% of a width WG of the gap G (0<thickness of second insulating layer<0.3 WG).

In some embodiments, the curved reflective surface 110R of the first reflective layer 110 may be formed that a portion of the first reflective layer 110 corresponding to the center of the gap G is closer to the substrate 130 than another portion of the first reflective layer 110 corresponding to the peripheral of the gap G. Accordingly, the curved reflective surface 110R forms a concave reflective surface for the front light LA, which helps to concentrate the reflected light LR toward the gap G and enhances the reflective efficiency of the electronic device 100A.

Figure 3:
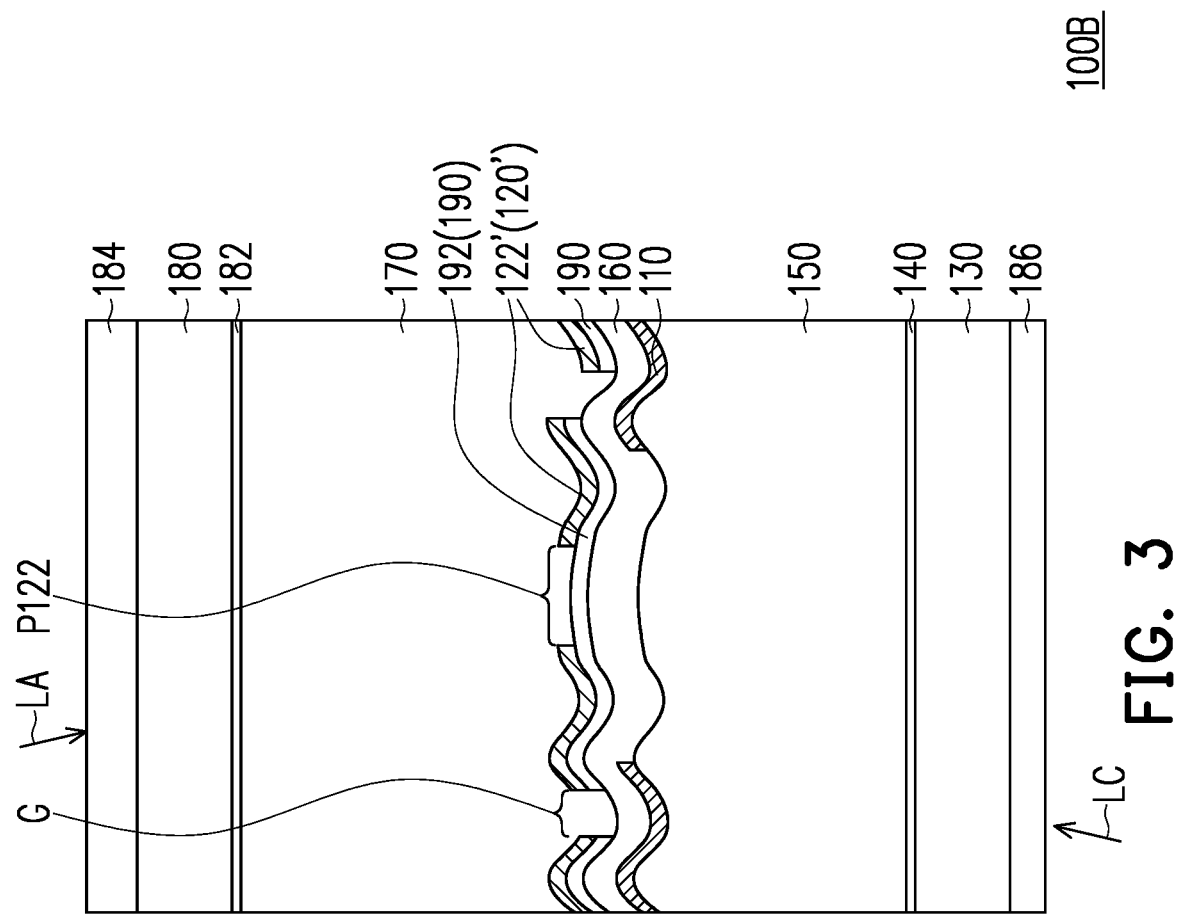
FIG. 3 schematically illustrates a cross sectional view of a portion of an electronic device in accordance with some embodiments.

FIG. 3 schematically illustrates a cross sectional view of a portion of an electronic device in accordance with some embodiments. The cross sectional view of FIG. 3 may be considered as an implemental embodiment of the electronic device 100 taken along line I-I of FIG. 1. Specifically, some components presented in FIG. 3 is omitted in FIG. 1 since FIG. 1 mainly shows the first reflective layer 110 and the second reflective layer 120 for illustrative purpose. In addition, the electronic device 100A is similar to the electronic device 100B and thus the same reference numbers in the two embodiments may refer to the same or similar components that are applicable to both embodiments. Referring to FIG. 3, the electronic device 100B includes a substrate 130, a circuit layer 140, a first insulating layer 150, a first reflective layer 110, a second insulating layer 160, a second reflective layer 120', a liquid crystal layer 170, another substrate 180, a top electrode 182, an optical component 184, another optical component 186 and a transparent conductive layer 190. Specifically, the major difference between the electronic device 100B and the electronic device 100A includes that the electronic device 100B further includes the optical component 186 and the transparent conductive layer 190, and the pattern design of the second reflective layer 120' of the electronic device 100B. Accordingly, other components in the electronic device 100B may refer to the description of FIG. 2 and not repeat herein.

As shown in FIG. 3, the second reflective layer 120' is disposed on the second insulating layer 160 and includes a plurality of reflective sub-layers 122'. Similar to FIG. 2, a gap G is formed between two adjacent ones of the reflective sub-layers 122' and the first reflective layer 110 is disposed corresponding to the gap G. In the embodiments, the transparent conductive layer 190 is disposed on the second insulating layer 160 and the second reflective layer 120 is disposed on the transparent conductive layer 190. However, in some alternative embodiments, the disposition sequence of the second reflective layer 120' and the transparent conductive layer 190 may be altered that the transparent conductive layer 190 is disposed on the second reflective layer 120' and relatively away from the second insulating layer 160.

In some embodiments, one of the reflective sub-layers 122' has an opening P122 and the transparent conductive layer 190 is at least located at the opening P122. In some embodiments, the transparent conductive layer 190 is in direct contact with the second reflective layer 120' and includes transparent sub-layers 192 that are spaced from each other by at least the gap G. In addition, each of the transparent sub-layers 192 overlaps and contacts with one of the reflective sub-layers 122' and exposed by the opening P122 of the corresponding reflective sub-layer 122'. In some embodiments, the opening P122 has an enclosed pattern in the top view, and the opening P122 is completely surrounded by the material of the second reflective layer 120, but the disclosure is not limited thereto. In some embodiments, the transparent sub-layers 192 as well as the reflective sub-layers 188' are configured to be applied with data voltages to drive the liquid crystal layer 170 to display an image and serve as pixel electrodes.

In addition, the electronic device 100B includes a pair of optical components, the optical component 184 and the optical component 186. The optical component 184 and the optical component 186 are disposed at two opposite sides of the electronic device 100B. In some embodiments, the optical component 184 and the optical component 186 are polarizers respectively disposed at the outer surfaces of the substrate 180 and the substrate 130, respectively. The polarization direction of the optical component 184 may be different from the polarization direction of the optical component 186, but the disclosure is not limited thereto. The front light LA entering the electronic device 100B from the optical component 184 may be reflected by the first reflective layer 110 and the second reflective layer 120 to display an image in a reflective manner. In addition, the backside light LC entering the electronic device 100B from the optical component 186 is able to pass through the opening P122 to display an image in a transmissive manner. Therefore, the electronic device 100B may be a trans-reflective display. In some embodiments, both the front light LA and the backside light LC are ambient light. In some embodiments, the backside light LC may be provided by a backlight module.

Figure 4:
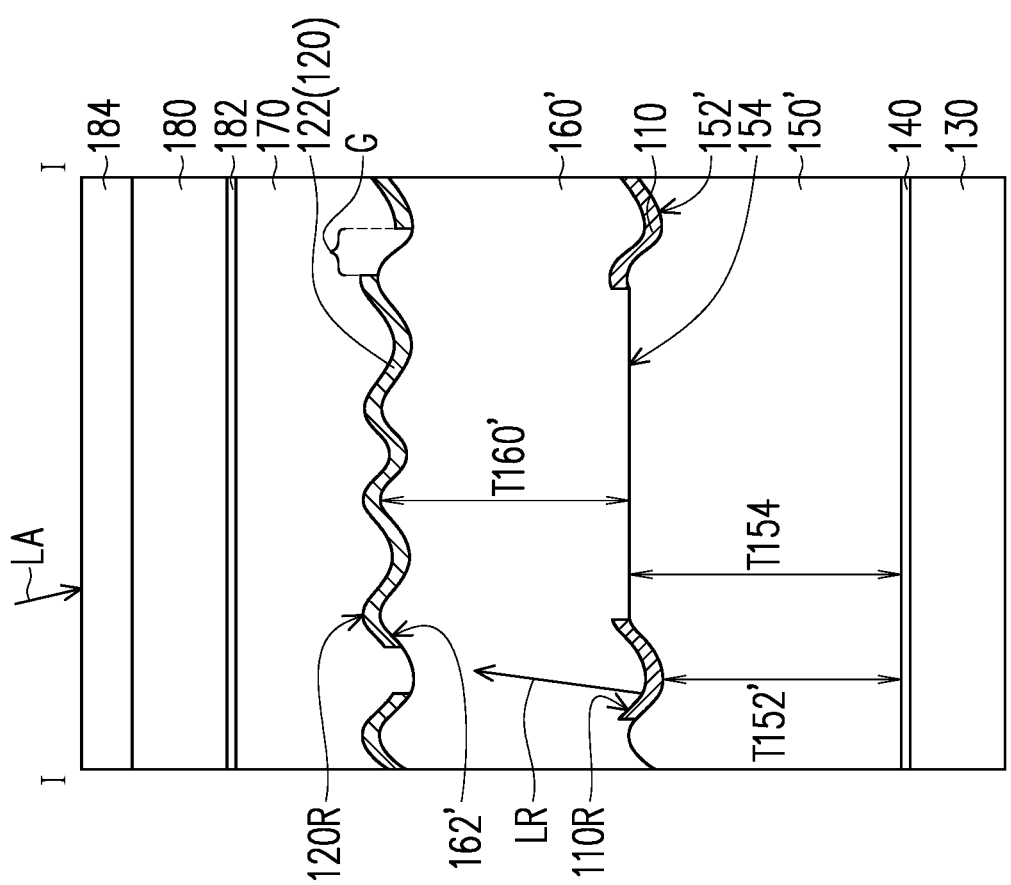
FIG. 4 schematically illustrates a cross sectional view of a portion of an electronic device in accordance with some embodiments.

FIG. 4 schematically illustrates a cross sectional view of a portion of an electronic device in accordance with some embodiments. The cross sectional view of FIG. 4 may be considered as an implemental embodiment of the electronic device 100 taken along line I-I of FIG. 1. Specifically, some components presented in FIG. 4 is omitted in FIG. 1 since FIG. 1 mainly shows the first reflective layer 110 and the second reflective layer 120 for illustrative purpose. In addition, the electronic device 100C is similar to the electronic device 100A and thus the same reference numbers in the two embodiments may refer to the same or similar components that are applicable to both embodiments. Referring to FIG. 4, the electronic device 100C includes a substrate 130, a circuit layer 140, a first insulating layer 150', a first reflective layer 110, a second insulating layer 160', a second reflective layer 120, a liquid crystal layer 170, another substrate 180, a top electrode 182, and an optical component 184. The main difference of the electronic device 100C from the electronic device 100A includes the first insulating layer 150' and the second insulating layer 160'. Therefore, other components of the electronic device 100C may refer to the descriptions of FIG. 2.

In some embodiments, a thickness T160' of the second insulating layer 160' is from 1 μm to 3 μm. Larger thickness of the second insulating layer 160' facilitates to reduce the capacitance between the first reflective layer 110 and the second reflective layer 120. In addition, the second insulating layer 160' has bumpy surface 162'. In some embodiments, the reflective sub-layers 122 of the second reflective layer 120 overlaps the bumpy surface 162'. In some embodiments, the reflective sub-layers 122 are disposed on the bumpy surface 162' in a substantially conformal manner. Specifically, the reflective sub-layers 122 are curved along the bumpy surface 162' to provide a curved reflective surface 120R to reflect the incident front light LA. The curved reflective surface 120R of the second reflective layer 120 facilitates to reflect the incident front light LA toward various directions to achieve a display effect of wide viewing angle.

As shown in FIG. 4, the first insulating layer 150' includes a concave surface 152' at the gap G between the two adjacent ones of the plurality of reflective sub-layers 122 of the second reflective layer 120 and further includes a flat surface 154 below the plurality of reflective sub-layers 122. In addition, the second insulating layer 160' has bumpy surface 162' that is not limited to be conformed to the concave surface 152' and the flat surface 154 of the first insulating layer 150'.

In some embodiments, the first insulating layer 150' has a reduced thickness T152' to form the concave surface 152' and the thickness T154 of the first insulating layer 150' corresponding to the flat surface 154 is greater than the reduced thickness T152. In some embodiments, the concave surface 152' is formed that the portion of the first insulating layer 150' corresponding to the center of the gap G is closer to the substrate 130 than the portion of the first insulating layer 150' corresponding to the flat surface 154. Accordingly, the first reflective layer 110 curved along the concave surface 152' forms a curved reflective surface 110R that helps to concentrate the reflected light LR toward the gap G and enhances the reflective efficiency of the electronic device 100C.

In some embodiments, the first insulating layer 150' is made of an organic material and the second insulating layer 160' is also made of an organic material, but the disclosure is not limited thereto. The first insulating layer 150' and the second insulating layer 160' may be patterned through different patterning procedures, and the bumpy surface 162' may not conform to the concave surface 152'. In some embodiments, the first insulating layer 150 depicted in the previous embodiments is applicable to the electronic device 100C of FIG. 4, such as the flat surface 154 may be replaced by the bumpy surface 152.

Figure 5:
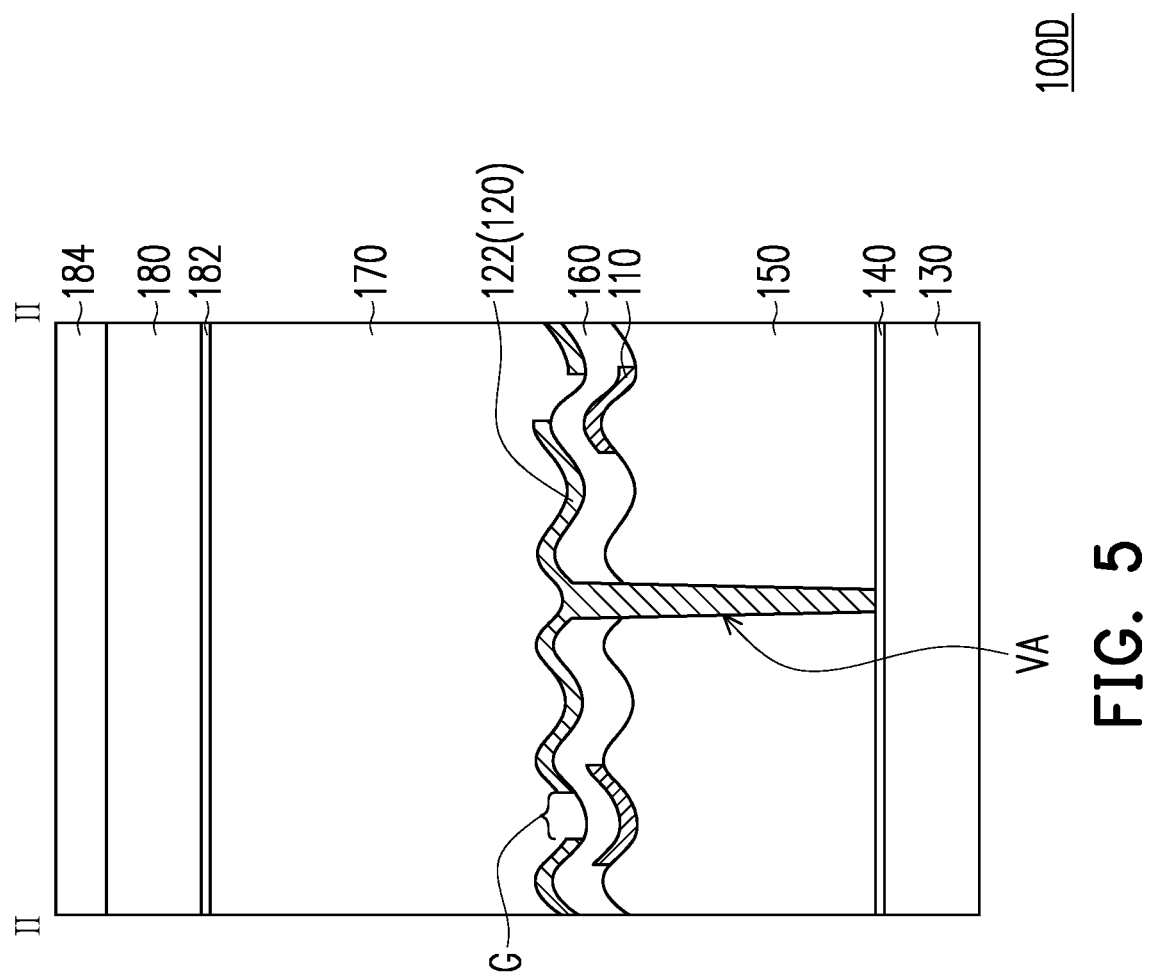
FIG. 5 schematically illustrates a cross sectional view of a portion of an electronic device in accordance with some embodiments.

FIG. 5 schematically illustrates a cross sectional view of a portion of an electronic device in accordance with some embodiments. The cross sectional view of FIG. 5 may be considered as an implemental embodiment of the electronic device 100 taken along line II-II of FIG. 1. Specifically, some components presented in FIG. 5 is omitted in FIG. 1 since FIG. 1 mainly shows the first reflective layer 110 and the second reflective layer 120 for illustrative purpose. In addition, the electronic device 100D is similar to the electronic device 100A and thus the same reference numbers in the two embodiments may refer to the same or similar components that are applicable to both embodiments. Referring to FIG. 5, the electronic device 100D includes a substrate 130, a circuit layer 140, a first insulating layer 150, a first reflective layer 110, a second insulating layer 160, a second reflective layer 120, a liquid crystal layer 170, another substrate 180, a top electrode 182, and an optical component 184. Specifically, FIG. 5 further presents the connection between the first reflective layer 110 and the circuit layer 140. The connection and design of the circuit layer 140 shown in FIG. 5 is applicable to any of the previous embodiments. In addition, FIG. 6 schematically presents the respective layers of the circuit layer 140, the first insulating layer 150, the first reflective layer 110, the second insulating layer 160, and the second reflective layer 120.

Figure 6:
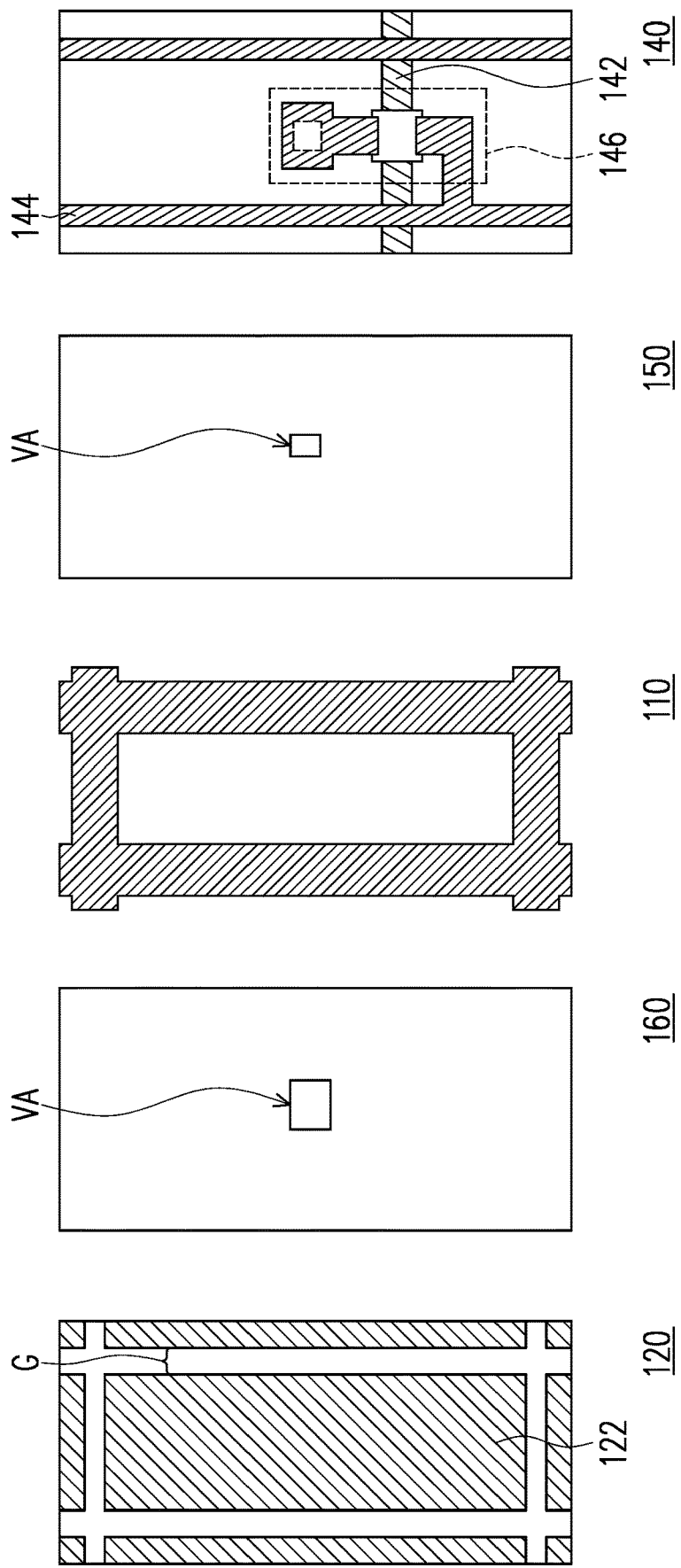
FIG. 6 schematically presents the respective layers of the electronic device depicted in FIG. 5

Referring to FIG. 5 and FIG. 6, the reflective sub-layer 122 of the second reflective layer 120 is electrically connected to the circuit layer 140 through a via VA passing through the first insulating layer 150 and the second insulating layer 160. In some embodiments, the circuit layer 140 in the electronic device 100D includes a scan line 142, a data line 144, and an active device 146. The scan line 142 is configured to enable the active device 146, and the signal transmitted on the data line 144 can be transmitted through the active device 146. The first insulating layer 150 and the second insulating layer 160 are disposed over the active device 146 of the circuit layer 146. The via VA is located overlapping the electrode of the active device 146 and extends through the first insulating layer 150 and the second insulating layer 160 until reach an electrode of the active device 146. The reflective sub-layer 122 of the second reflective layer 120 may fill the via VA to connect to the electrode of the active device 146. Accordingly, the reflective sub-layer 122 serves as a pixel electrode receiving the date voltage transmitted on the date line 144 as the active device 146 is enabled by the scan line 142. In some embodiments, the data line 144 may extend along the gap G between the reflective sub-layers 122 of the second reflective layer 120. Therefore, the first reflective layer 110 may overlap the data line 144 in the top view, but the disclosure is not limited thereto. In some embodiments, the size of the via VA in the first insulating layer 150 may be smaller than that in the second insulating layer 160, but the disclosure is not limited thereto.

In some embodiments of the disclosure, the electronic device includes two reflective layers, the first reflective layer and the second reflective layer. The first reflective layer is disposed corresponding to the gap between the reflective sub-layers of the second reflective layer. As such, the first reflective layer provides the reflect effect at the area where the second reflective layer is absent. Therefore, the electronic device would have desirable reflective efficiency. The electronic device presents good display brightness under the reflective displaying technique.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic device, comprising:
a substrate;
a circuit layer disposed on the substrate;
a first insulating layer disposed on the circuit layer;
a first reflective layer disposed on the first insulating layer;
a second insulating layer disposed on the first reflective layer;
a transparent conductive layer disposed on the second insulating layer; and
a second reflective layer disposed on the second insulating layer,
wherein the second reflective layer comprises a plurality of reflective sub-layers, and a portion of the first reflective layer is disposed corresponding to a gap between two adjacent ones of the plurality of reflective sub-layers,
wherein the second reflective layer is electrically connected to the circuit layer through a via passing through the first insulating layer and the second insulating layer,
wherein the first reflective layer overlaps the reflective sub-layers in a top view,
wherein one of the reflective sub-layers has an opening, the transparent conductive layer overlaps and contacts with the one of the reflective sub-layers, and the transparent conductive layer is exposed by the opening.

2. The electronic device of claim 1, wherein the one of the reflective sub-layers is configured to be applied with a data voltage.

3. The electronic device of claim 2, wherein the first reflective layer is configured to be applied with a reference voltage less than the data voltage.

4. The electronic device of claim 1, wherein a thickness of the second insulating layer is less than 0.7 μm or 30% of a width of the gap.

5. The electronic device of claim 1, wherein the first reflective layer comprises a mesh-like structure.

6. The electronic device of claim 1, wherein the first insulating layer comprises a bumpy surface.

7. The electronic device of claim 6, wherein the first reflective layer is curved along the bumpy surface.

8. The electronic device of claim 6, wherein the second insulating layer is curved along the bumpy surface.

9. The electronic device of claim 1, further comprising a liquid crystal layer disposed on the second reflective layer.

10. The electronic device of claim 1, wherein the second insulating layer comprises SiOx or SiNx.

11. The electronic device of claim 1, wherein the first insulating layer comprises an organic material.

12. The electronic device of claim 1, wherein the first insulating layer comprises a concave surface at the gap between the two adjacent ones of the plurality of reflective sub-layers and comprises a flat surface below the plurality of reflective sub-layers.

13. The electronic device of claim 12, wherein a thickness of the second insulating layer is from 1 μm to 3 μm.

14. The electronic device of claim 12, wherein the second insulating layer comprises an organic material.

15. The electronic device of claim 12, wherein the first insulating layer has a reduced thickness to form the concave surface.

16. The electronic device of claim 1, wherein a reflectance of the first reflective layer is greater than 80%.

* * * * *